United States Patent [19]
Johnson

[11] Patent Number: 5,328,667
[45] Date of Patent: Jul. 12, 1994

[54] ATTACHMENT FOR SECURING HIGH TEMPERATURE INTERNALS TO REFRACTORY LINED PRESSURE VESSELS

[75] Inventor: Daniel R. Johnson, Schaumburg, Ill.

[73] Assignee: UOP, Des Plaines, Ill.

[21] Appl. No.: 923,773

[22] Filed: Aug. 3, 1992

[51] Int. Cl.$^5$ .......................... B01J 8/18; F27B 15/00
[52] U.S. Cl. .................... 422/143; 277/164; 277/230; 422/144; 422/240; 422/241; 422/310; 52/396.01
[58] Field of Search ............... 422/240, 241, 144, 310, 422/312, 143; 110/336, 331, 322, 324, 323, 325; 52/573, 249, 267–268; 277/164, 189, 201, 229, 230

[56] References Cited
U.S. PATENT DOCUMENTS

| | | | |
|---|---|---|---|
| 4,114,907 | 9/1978 | Abbes et al. | 277/164 X |
| 4,453,723 | 6/1984 | Greenwald | 277/164 |
| 4,493,816 | 1/1985 | Becker et al. | 422/144 |
| 5,063,028 | 11/1991 | Humble et al. | 422/240 |

Primary Examiner—James C. Housel
Assistant Examiner—Krisanne M. Thornton
Attorney, Agent, or Firm—Thomas K. McBride; John G. Tolomei

[57] ABSTRACT

A special sealing arrangement provides a chamber between hot metallic internals attached to cold wall pressure vessel shells to preserve the integrity of the lining and to minimize thermal stresses imposed on the shell and the internals. The sealing element of this invention is a mesh blanket composite having opposite ends secured by different brackets to the internal structure and the cold wall pressure vessel shell. The membrane composite allows gases to escape from a heat transfer chamber between the internal structure and the pressure vessel shell while blocking the passage of catalyst into the chamber. This catalyst seal device is particularly useful in FCC units where fine catalyst particles can migrate into expansion chambers provided between an internal cone and the regenerator shell.

10 Claims, 2 Drawing Sheets

ATTACHMENT FOR SECURING HIGH TEMPERATURE INTERNALS TO REFRACTORY LINED PRESSURE VESSELS

BACKGROUND OF THE INVENTION

1. Field of the Invention

This invention relates generally to the attachment of internal equipment to pressure vessels. More specifically, this invention relates to pressure vessels containing high temperature particulate material and the attachment of high temperature internal partitions or baffles to relatively cold pressure vessel walls.

2. Description of the Prior Art

Common methods of processing chemicals and hydrocarbons routinely contact such materials with particulate materials comprising catalyst or adsorbents. High temperatures are frequently encountered in such processing so that containment vessels in which the particulate material and fluids undergoing processing or treatment are contacted often utilizing internal insulating lining on the inside of the metal containment vessel. The metal lining supports the insulating material and the insulating material lowers the temperature of the metal lining thereby permitting fabrication of the pressure vessel from less expensive metals.

Processing steps conducted within such vessels often require internal partitions to divide the internal area of the vessel into separate zones for carrying out processing steps or supporting internal equipment. The partitions often have a continuous circumferential attachment to the pressure containing vessel to seal different sections of the vessel from fluid or particulate flow. The continuous attachment of a partition that extends into the high temperature region of the containment vessel creates differential expansion between the relatively cold containment vessel shell and the much hotter partition attached thereto. This differential expansion deteriorates the structural integrity of the partition as well as any adjacent refractory lining.

One common form of such partition is in a regeneration vessel for the fluidized catalytic cracking (FCC) of hydrocarbons. In this process, the interior of the regeneration vessel operates at temperatures in excess of 1300° F. A rigid concrete-like lining, referred to as a refractory lining, covers the inside of the regeneration vessel to insulate the containment vessel from the high internal temperatures. Many of the regeneration vessels are divided by an internal structure into an upper regenerator and a lower regenerator section. The internal structure normally has a frusto conical or cylindrical form with the lowermost point rigidly attached, in most cases welded, about a circumferential section of the regenerator shell. The higher temperature of the internal cone with respect to the colder regeneration vessel sometimes results in bulging of the vessel wall section, spalling or breakage of the refractory lining, and most often localized deformation of the internal structure, all at the point of attachment to the pressure vessel wall. The prior art has tried a number of arrangements to alleviate the deformation of pressure vessels and attachments at their junction; in particular, soft insulating linings, and air spaces to solve the aforementioned problems. Soft insulation with or without a flexible containment liner has replaced the rigid refractory lining at the localized section of a junction between a cold external shell and an internal partition. In addition, other arrangements interpose a flexible element at the junction of the cold vessel shell to the internal structure to permit expansion of the partition without imposing deforming stresses on the shell of the pressure vessel. The air space at the junction often loses its effectiveness due to the migration of particulate material, lining, or other debris into the air space.

SUMMARY OF THE INVENTION

Applicant has discovered a junction arrangement between a cold wall vessel shell and a hot internal partition that substantially reduces the deformation problem by providing a chamber at the point where the internal attaches to the vessel wall and a seal arrangement that will prevent the migration of particulate or other loose material into the chamber. The open chamber provides a volume of free convection or controlled heat transfer between the surfaces of the partition and a vessel wall shells that extends the temperature gradient of the partition. Where the partition attaches to the vessel wall, the vessel wall and partition have essentially the same relatively cold temperature. As the partition extends into the interior of the pressure vessel, its temperature increases until it ultimately has substantially the same temperature as the internal temperature of the vessel. The open chamber maintained between the partition and the vessel wall, provides a more gradual change along the partition from the cold temperature of the vessel wall to the high internal operating temperature of the pressure vessel. Where the partition extends upwardly into the pressure vessel, particulate material fills any open area between the vessel wall and the partition. Soft insulation and air space arrangements of the prior art do not protect against the migration of catalyst particles into the volume between the pressure vessel shell and an upwardly extending partition. The volume of the chamber whether empty or containing a predetermined amount of insulation will control the temperature gradient to lower stresses imposed by the rigid restraint of the partition through its attachment to the vessel wall. Applicant's invention preserves the beneficial thermal gradient effects of the open space between the vessel wall and upwardly extending partition by sealing the top of the space with a flexible seal that blocks particles and fine material, is permeable to gas, and has sufficient strength to resist the loads imposed by catalyst resting thereon.

Accordingly, this invention is a vessel and partition for containing particulate material. A junction of the vessel and partition define an annular chamber inside the vessel and to the outside of the partition. At the top of the chamber, a catalyst seal provides means for blocking the entry of particulate material into the chamber and for permitting gas flow out of the chamber. A part of the means for sealing the top of the chamber includes a flexible mesh element that extends circumferentially about the top of the chamber.

DETAILED DESCRIPTION OF THE PREFERRED EMBODIMENT

The sealing device of this invention finds utility in a number of pressure vessel applications. The type of pressure vessels to which this invention applies are refractory lined pressure vessels that normally operate under high internal temperatures. The attachment device of this invention allows the continuous attachment of metallic internals around circumferential sections of the vessel interior without the attendant bulging and spalling of refractory lining that typifies the prior art. Thus, this invention is suitable for any high temperature pressure vessel that uses internal refractory lining and internals that expand against the shell of the pressure vessel at a greater rate than the expansion of the vessel to which it is attached. A typical type of pressure vessel to which this invention applies is an FCC regenerator.

Figure 1:
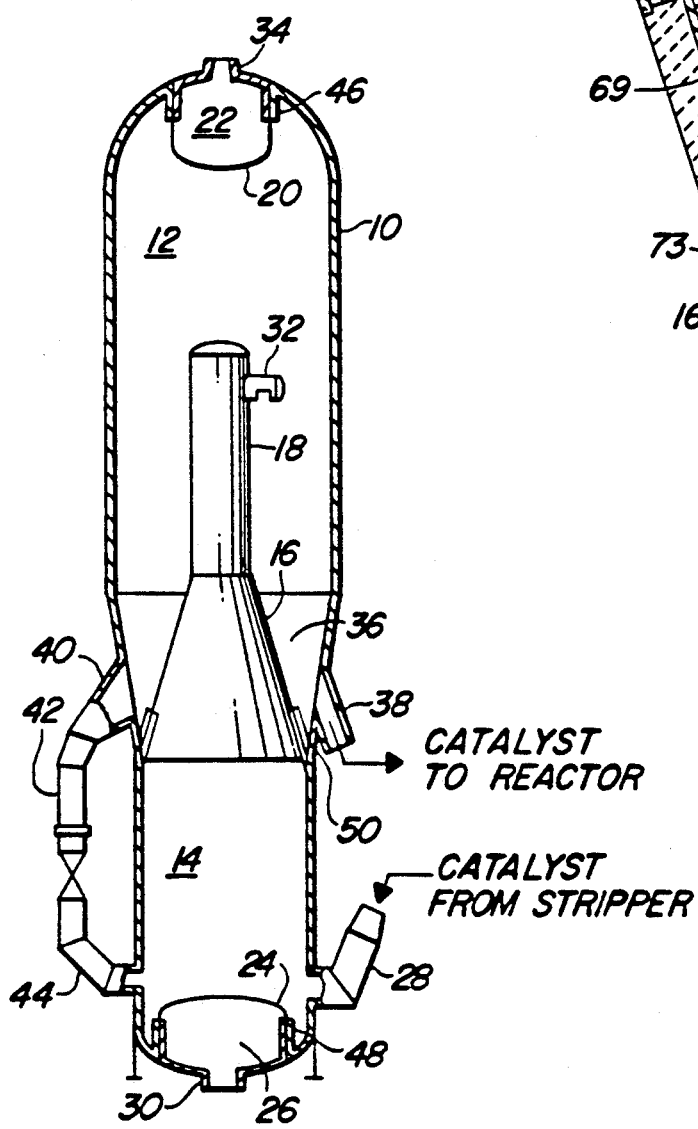
FIG. 1 presents a simplified cross-section of an FCC regeneration vessel.

The FCC regenerator is shown in more detail in FIG. 1. The regenerator has an outer shell 10 subdivided into an upper zone 12 and a lower zone 14 by a partition in the form of a riser cone 16 and riser conduit 18. Additional partitions in the form of a plenum 20 and a distributor zone 24 segregate a gas collection chamber 22 and an air distribution chamber 26 from the interior of the regeneration vessel. The regenerator operates by receiving catalyst from a stripper of a reactor section (not shown) through a nozzle 28. As catalyst enters nozzle 28, pressurized air from a nozzle 30 passes across dome section 24 that distributes the air over the cross-section of lower zone 14 and into contact with the entering catalyst. Coke on the catalyst combusts with the air thereby evolving heat and creating high temperatures, typically in excess of 1300° F., in the regeneration vessel. The pressurized air stream transports the catalyst upwardly through the lower zone 14, frusto conical section 16, riser conduit 18, and a riser outlet 32 into the upper zone 12. The catalyst disengages from the combustion gases in upper zone 12 and a separation device such a cyclone separator (not shown) separates additional amounts of catalyst from the combustion gases. Combustion gases collect in chamber 22 and nozzle 34 withdraws hot combustion gases from the regeneration zone. As catalyst disengages from the combustion gases, it collects in a collection zone 36, defined by frusto conical section 16 and the outer wall of regeneration vessel 10. A withdrawal nozzle 38 removes a portion of the collected catalyst and transfers it to the previously mentioned reactor system. Another nozzle 40 and conduit 42 withdraws a portion of the collected catalyst and recirculates the catalyst through a nozzle 44 into the lower zone 14. To protect the metallic wall 10 of the regeneration vessel from the erosive effects as well as the high temperatures of the particles inside the vessel, a refractory lining typically covers most portions of the pressure containing section of the vessel wall.

Figure 2:
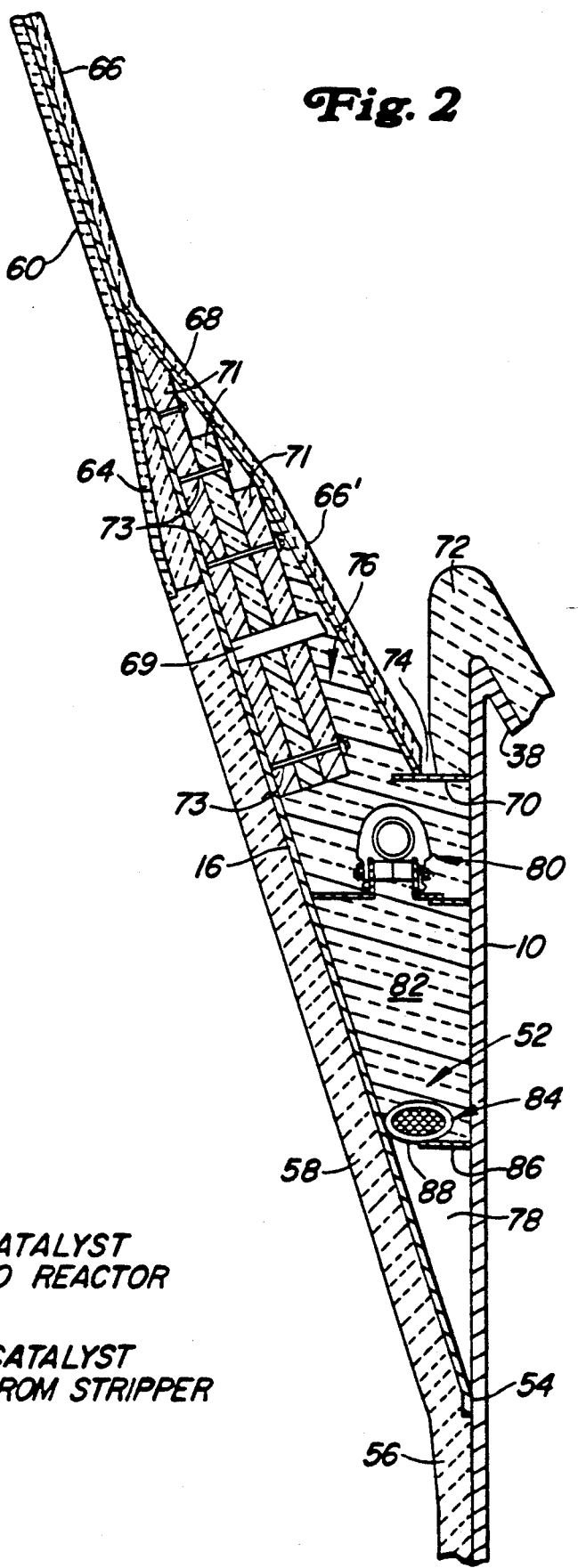
FIG. 2 is an enlarged detail of a regeneration cone section showing the position of the seal device of this invention and the location of the air space.

In the regeneration vessel of FIG. 1, there are a number of points where partitions continuously attach around the circumference of vessel wall 10. These attachment points include the upper end of plenum section 20, the lower end of frusto conical cone 16, and the lower end of distribution dome 24. At all of these points, the internal structure attached to the vessel wall will expand more than the vessel wall to which it is attached. In the past, refractory lining was extended down the length of the internal structure in order to provide a more gradual change in temperature between the portions of the internal structure operated at the full internal temperature of the regeneration vessel and the coldest portion of the internal structure where it attaches to the pressure vessel wall. The plenum chamber has such an extended section of lining 46 which will usually extend for 2-3 feet. In order to provide flexibility between the expanding internal and the rigid refractory lining, a soft blanket type insulation would provide the extension 46 of the lining down the outside of the internal structure. Extending the lining with a soft blanket insulation to provide flexibility does not work as well at other junctions between relatively hot internal structures and the relatively cold vessel wall. The extension of the lining 48 at the air distribution dome and lining 50 at the frusto conical section 16 creates a pocket that permits catalyst to accumulate at the junction between the internal and the vessel wall. This catalyst imposes a loading on the blanket insulation that can compress it and reduce its effectiveness. Furthermore, as the diameter of the internal structure that attaches to the cold wall of the vessel increases, the magnitude of stresses resulting from the differential expansion between the relatively hot internal and the relatively cold vessel wall, also increases. To overcome these higher stress levels, additional means are necessary to reduce the magnitude of such stresses. FIG. 2 shows an arrangement in the region of the lining extension 50 for such a junction including the catalyst seal device of this invention.

The geometry of the junction between frusto conical section 16 and the pressure vessel wall 10 is more fully depicted by FIG. 2. The intersection between the upwardly extending external wall 10 and the upwardly extending frusto conical section 16 define a restricted volume 52 that extends around the circumference of the pressure vessel 10. The cross-sectional shape of restricted volume 52 for the FCC regenerator is generally triangular in form as a result of the geometry of the frusto conical cone and the wall 10 of the pressure vessel. Volume 52 provides a chamber for the location of the catalyst seal device of this invention. However, there is no requirement that the annularly extending chamber provided by restricted volume 52 have a particular cross-sectional form. The annular volume formed by the junction between the internal partition and the vessel wall may be cylindrical in shape, however, it has been found that the preferred triangular form for the volume provides the best means of minimizing stresses at the junction 54 between the internal attachment and the pressure vessel wall 10.

A variety of linings and insulations typically are used at the junction between the internal partition and the vessel wall. As depicted in FIG. 2, a section of the rigid refractory lining 56 extends below junction 54 and another portion 58 extends upwardly along the inside portion of conical section 16. The top of section 58 ends in a gradual taper and is replaced by a thin refractory lining typically in the form of an abrasion resistant lining 60. Where the refractory lining 58 tapers to the abrasion resistant lining 60, both linings are used in combination over a section 64 to reinforce the refractory lining 58. Methods and details for applying refractory lining and thin abrasion resistant linings are well known by those skilled in the art. The abrasion resistant lining continues on an upper portion 66 of conical section 16. Proceeding down the outside of conical section 16, a metal plate section 68 supports another section of abrasion resistant lining 66' at an increasing distance from conical section 16. The abrasion resistant lining 66 and plate 68 terminate in a sliding arrangement with a support plate 70 at a location adjacent to vessel wall 10. Another portion of refractory lining 72 extends upward from support plate 70 and wraps around the metal wall of nozzle 38. A gap 74 between the end of the abrasion resistant lining 66' and the refractory lining 72 allows for outward thermal expansion of conical section 16. A plate 69 extending outward from conical cone 16 and spaced apart from plate 68 provides additional support for plate 68 to prevent excessive deformation of the plate as conical section 16 expands outwardly. The internal cavity defined by conical section 16, sealing device 80, vessel wall 10, and plates 68 and 70 is filled with a soft blanket type insulation made of ceramic fiber materials.

A variety of arrangements can be used to fill cavity 76 with blanket type or compressible insulation. The cavity may be completely filled with any type of insulation that will allow conical section 16 to deflect outwardly and will not impose excessive restraint on plate section 68. The blanket fiber insulation may be installed above catalyst seal 80 in any manner that will keep the insulation in place. The insulation above seal 80 serves the important function of drawing cooler temperatures farther up conical section 16 toward the interior of the regeneration vessel. To prevent blanket insulation from compressing and leaving an open void space behind plate 68, several discrete layers of blanket insulation 71 may be secured to the outer portion of cone 16 behind plate 68 by anchors 73.

Seal device 80 separates chamber 76 from the volume 52. Volume 52 may also contain some blanket insulation. Preferably, the compressible insulation will not extend all the way down to the junction of the conical section and vessel wall 10, but will provide an open space 78. Providing an open chamber portion 78 cools the lower section of the cone at the attachment to the vessel shell by maximizing heat transfer between the external wall and the partition in the immediate area adjacent to the attachment. When provided, the length of the open section 78 is usually from 1 to 3 feet.

Primary seal 80 prevents particulate material, such as catalyst that migrates around plate 68, from entering volume 52 and any void space 78. In some arrangements, void space 78 may be completely open up to the bottom of seal 80. Alternately, as depicted in FIG. 2, a portion of blanket insulation 82 fills the area of chamber 52 below primary seal 80 and above a retaining member 84. Retaining member 84 ensures that the blanket insulation does not fall into void space 78 and in one form consists of an annular plate 86 and a ring of braided stainless steel hose 88 secured to plate 86 and abutting the outer portion of cone 16. The primary purpose of a retaining device 84 is simply to hold the blanket insulation since the primary seal 80 will prevent any substantial migration of particles into the lower portions of chamber 52.

Figure 3:
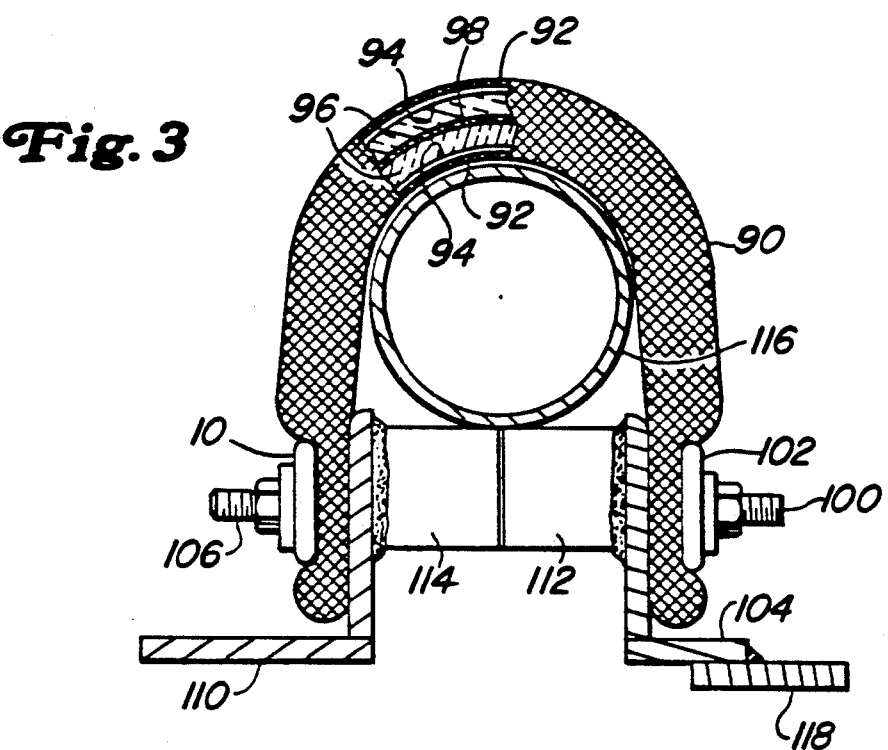
FIG. 3 is a cross-section of the sealing device of this invention.

Referring then to FIG. 3, an essential part of the primary seal 80 is a gas permeable and particle blocking element 90 that bridges an expansion space between the vessel wall 10 and the conical section 16. The cut away in FIG. 3 shows the preferred form of the flexible element where it consists of two layers of knitted wire mesh 92 on the outside of layers of silica fabric cloth 94 which in turn surround two layers 96 of ceramic fiber blanket insulation separated by another layer 98 of silica fabric cloth. In one form of the mesh composite 90, the two layers of wire mesh are made from 0.012 inch thick type 309 stainless steel, and the layers of ceramic fiber blanket insulation are each a half-inch thick with a density of 8 lb/ft$^2$. Where the operating temperatures inside the pressure vessel are in excess of 1000° F., all metallic internals will typically comprise the stainless steel and more particularly type 309 or 304 stainless steel. A series of bolts 100 and a backing bar 102 secures one side of the flexible element or mesh blanket composite 90 to a bracket 104. Similarly, a separate set of bolts 106 and a backing bar 108 secure the opposite side of mesh composite 90 to a bracket 110. A series of spaced apart lugs 112 extend from bracket 104 towards bracket 110 and another series of lugs 114 offset from lugs 112 extends towards bracket 104 from bracket 110. Lugs 112 and 114 carry a mesh support member 116 which is ordinarily in the form of a ring of hollow tubing. The mesh composite 90 wraps around the tubing to support the mesh blanket under the load of any particulate material that accumulates on top of the seal. The ends of brackets 110 and 104 are attached to one or the other of conical section 16 and vessel wall 10. In order to provide field adjustment, only one bracket, 110, has a direct attachment to conical section 16 while the outer end of bracket 104 is attached in the field to a plate 118 which is first installed to pressure vessel wall to provide support of the seal element 80 during installation. Brackets 104 and 110 are installed in a manner that provides an annular space between the two brackets so that conical section 16 is free to move towards the wall section 10 while the flexible element 90 prevents particulate material from passing below the seal.

Figure 4:
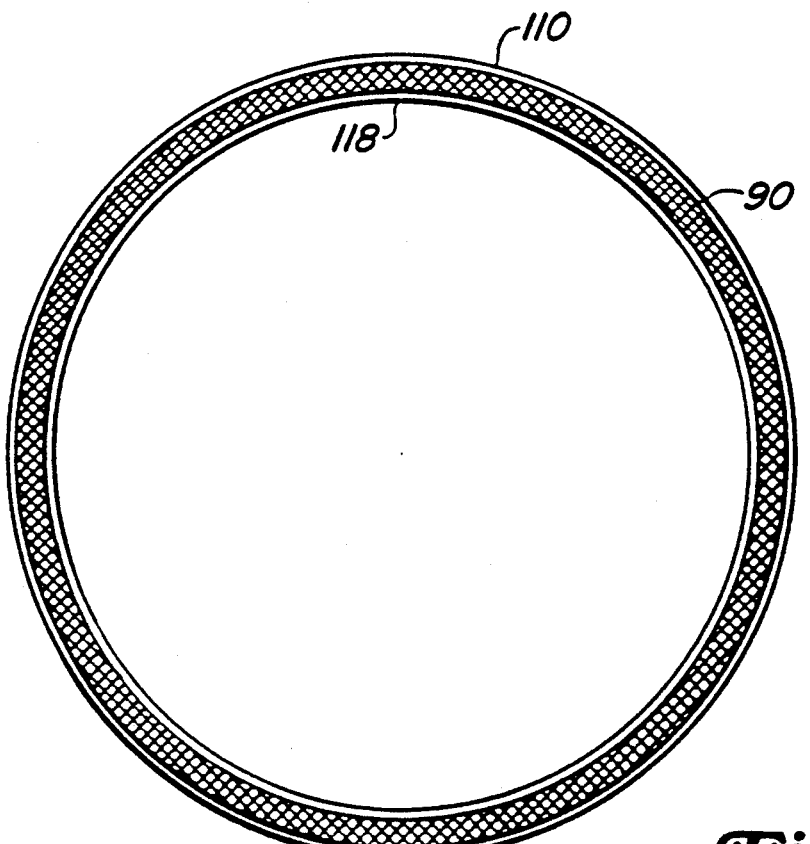
FIG. 4 is a plan view of the sealing device of this invention.

The catalyst seal section extends circumferentially around the entire periphery of the cone section 16 to provide a complete seal for chamber 52. In most arrangements, the primary seal 80 will have a ring shape as depicted in FIG. 4. Elements numbered in FIG. 4 are the same as those numbered in FIG. 3. However, the configuration of the seal may be altered as necessary to suit the geometry of the internal structure attached to the vessel wall provided the seal has an arrangement that blocks the migration of particulate material into an expansion chamber between the partition and the vessel wall.

What is claimed is:

1. A vessel and partition for containing particulate material comprising:
   (a) a vessel wall that extends upwardly;
   (b) a partition extending upwardly wherein a portion of said partition is fixed to a circumferential section of the inside of said vessel wall;
   (c) a chamber having an annular form at least partially defined by a portion of the inside of said vessel wall and the outside of said partition; and
   (d) means located at the top of said chamber for blocking the entry of particulate material into said chamber and for permitting gas flow into said chamber, said means comprising a sheet of gas permeable flexible mesh extending circumferentially about the top of said chamber with one side fixed with respect to said vessel wall and an opposite side fixed with respect to said partition.

2. The apparatus of claim 1 wherein a rigid insulating material covers a portion of the interior of said vessel wall.

3. The apparatus of claim 1 wherein the portion of the inside of the vessel wall defining said chamber is free of rigid insulating material.

4. The apparatus of claim 1 wherein said means further comprises a ring of tubing, said gas permeable flexible mesh covering an upper portion of said tubing.

5. The apparatus of claim 1 wherein the portion of said partition fixed to said vessel wall has a frusto conical or a cylindrical shape.

6. The apparatus of claim 4 wherein said means further comprises a first bracket having one side fixed to said vessel wall and a first edge of said gas permeable flexible mesh fixed to an opposite side of said first bracket, a second bracket having one side fixed to said partition and a second edge of said gas permeable flexible mesh fixed to an opposite side of said second bracket, an annular space defined by brackets, and lugs extending from said brackets into said annular space to support said ring of tubing.

7. A regeneration apparatus for the high temperature regeneration of particulate material, said apparatus comprising:
(a) a regeneration vessel means;
(b) means for adding particulate material and fresh regeneration gas to said regeneration vessel means and withdrawing particulate material and spent regeneration gas from said regeneration vessel means;
(c) a partition that extends upwardly having a lower end fixed about the perimeter of said regeneration vessel means;
(d) an annular expansion chamber defined in part by said regeneration vessel means and the lower end of said partition;
(e) a catalyst seal at the top of said annular expansion chamber comprising a ring of mesh material, wherein the mesh material is gas permeable and substantially particle impermeable, having inner and outer edges with one of said edges fixed with respect to said regeneration vessel means and the other of said edges fixed with respect to said partition; and,
(f) a rigid insulating lining at least partially covering the interior of said regeneration vessel.

8. The apparatus of claim 7 wherein said annular expansion chamber has a triangular cross-section of revolution.

9. The apparatus of claim 7 wherein said catalyst seal comprises a ring of tubing, said mesh material covering an upper portion of said tubing, a first bracket having one side fixed to said regenerator vessel means and one edge of said mesh material fixed to an opposite side of said first bracket, a second bracket having one side fixed to said partition and the other edge of said mesh material fixed to an opposite side of said second bracket, an annular space defined by said brackets, lugs extending from said brackets into said annular space, and said ring of tubing located under said mesh material and supported by said lugs.

10. A gas permeable seal for blocking the migration of particulate material between flexible members, said seal comprising a first bracket, a second bracket, a space defined by adjacent sides of said first and second brackets, a first set of lugs fixed to said first bracket and extending into said space, a second set of lugs fixed to said second bracket and extending into said space, a tube extending in a direction parallel to said adjacent sides and supported by said lugs, and a gas permeable sheet of flexible mesh positioned over said tube and bridging said space, having a first edge fixed to said first bracket and a second edge fixed to said second bracket.

* * * * *